United States Patent
Cheng

(10) Patent No.: US 6,620,531 B1
(45) Date of Patent: Sep. 16, 2003

(54) MAGNETIC RECORDING MEDIA WITH OXIDIZED SEEDLAYER FOR REDUCED GRAIN SIZE AND REDUCED GRAIN SIZE DISTRIBUTION

(75) Inventor: Yuanda Randy Cheng, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 104 days.

(21) Appl. No.: 09/662,826

(22) Filed: Sep. 15, 2000

Related U.S. Application Data
(60) Provisional application No. 60/172,864, filed on Dec. 20, 1999, and provisional application No. 60/172,776, filed on Dec. 20, 1999.

(51) Int. Cl.[7] .............................. G11B 5/66; G11B 5/70; B05D 5/12
(52) U.S. Cl. ..................... 428/694 TS; 428/694 TC; 428/900; 427/130; 427/131
(58) Field of Search .................... 428/694 TS, 694 TC, 428/900; 427/138, 130, 131

(56) References Cited

U.S. PATENT DOCUMENTS

| | | | |
|---|---|---|---|
| 5,302,434 A | 4/1994 | Doerner et al. | 428/64 |
| 5,480,733 A | 1/1996 | Okumura et al. | 428/694 T |
| 5,587,234 A | 12/1996 | Kiser | 428/327 |
| 5,700,593 A | 12/1997 | Okumura et al. | 428/694 TS |
| 5,736,262 A * | 4/1998 | Ohkijima et al. | 428/611 |
| 5,846,648 A | 12/1998 | Chen et al. | 428/332 |
| 5,858,566 A | 1/1999 | Zhang | 428/694 TS |
| 5,866,227 A | 2/1999 | Chen et al. | 428/65.3 |
| 5,879,783 A | 3/1999 | Chang et al. | 428/141 |
| 5,939,202 A | 8/1999 | Ataka et al. | 428/457 |
| 5,981,018 A | 11/1999 | Lai et al. | 428/65.5 |
| 6,010,795 A | 1/2000 | Chen et al. | 428/611 |
| 6,042,939 A | 3/2000 | Takahashi | 428/332 |
| 6,080,476 A * | 6/2000 | Kanbe et al. | 428/332 |
| 6,117,570 A | 9/2000 | Chen et al. | 428/694 T |
| 6,228,515 B1 * | 5/2001 | Shin et al. | 428/694 TS |
| 6,309,765 B1 * | 10/2001 | Suekane et al. | 428/694 TS |

\* cited by examiner

*Primary Examiner*—Holly Rickman
(74) *Attorney, Agent, or Firm*—McDermott, Will & Emery

(57) ABSTRACT

High areal recording density magnetic recording media with improved signal-to-noise ratio and high thermal stability are formed using oxidized seedlayers to reduce the magnetic grain size and grain size distribution. Embodiments include sputter depositing a NiAl or NiP seedlayer doped with an element having a higher oxidization potential than NiAl or NiP, such as Co or Ti, and oxidizing so that the oxidized dopant element is distributed substantially uniformly throughout the seedlayer to provide increased nucleation sites.

19 Claims, 2 Drawing Sheets

Figure 1:
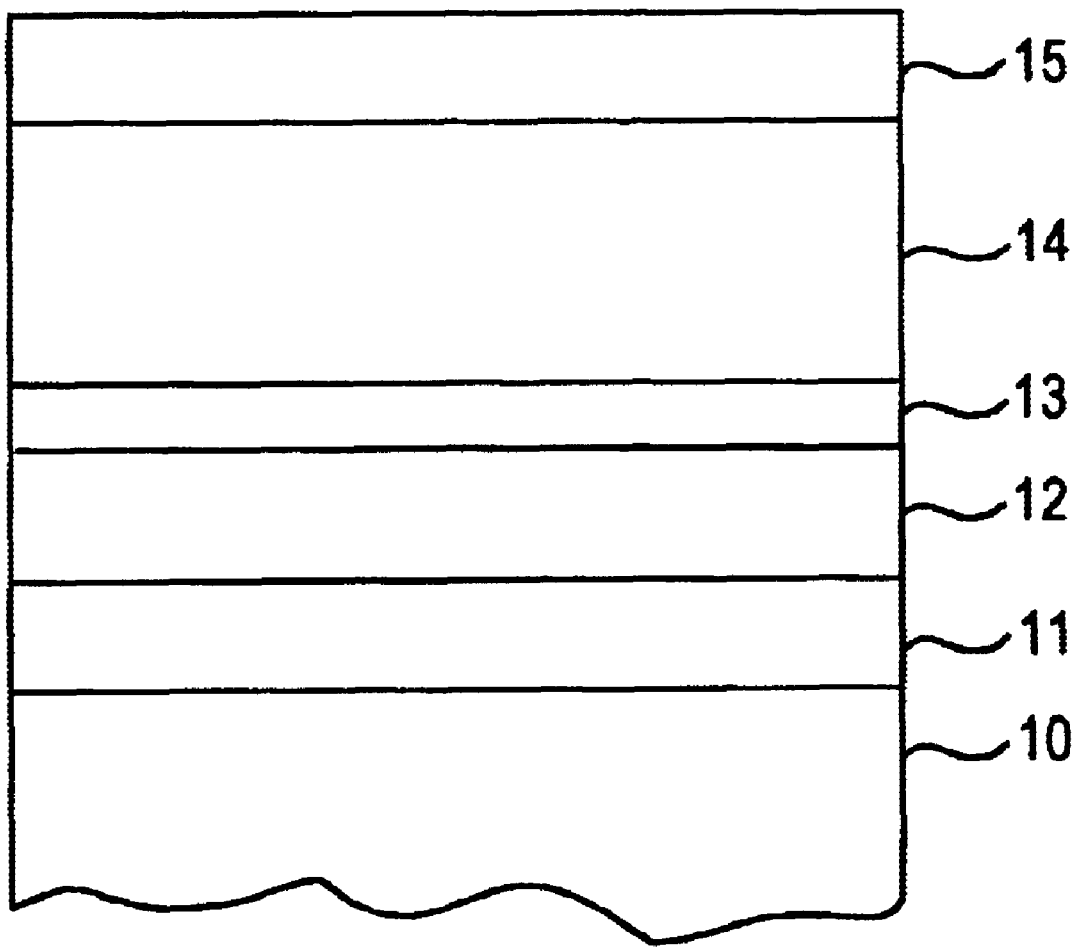

MAGNETIC RECORDING MEDIA WITH OXIDIZED SEEDLAYER FOR REDUCED GRAIN SIZE AND REDUCED GRAIN SIZE DISTRIBUTION

RELATED APPLICATIONS

This application claims priority from Provisional Application Serial No. 60/172,864 filed on Dec. 20, 1999 entitled: "MAGNETIC RECORDING MEDIA WITH OXIDIZED NiP—X SEEDLAYER". the entire disclosure of which is hereby incorporated by reference herein.

This application also claims priority from Provisional Application Serial No. 60/172,776 filed on Dec. 20, 1999 entitled: "MAGNETIC RECORDING MEDIA WITH OXIDIZED NiAl—X SEEDLAYER", the entire disclosure of which is hereby incorporated by reference herein.

TECHNICAL FIELD

The present invention relates to magnetic recording media, such as thin film magnetic recording disks, and to a method of manufacturing the media. The present invention has particular applicable to high areal density longitudinal magnetic recording media exhibiting low noise and enhanced magnetic performance.

BACKGROUND ART

Magnetic recording media are extensively employed in the computer industry and can be locally magnetized by a write transducer or write head to record and store information. The write transducer creates a highly concentrated magnetic field which alternates direction based upon bits of the information being stored. When the local magnetic field produced by the write transducer is greater than the coercivity of the recording medium, grains of the recording medium at that location are magnetized. The grains retain their magnetization after the magnetic field produced by the write transducer is removed. The direction of the magnetization matches the direction of the applied magnetic field. The magnetization of the recording medium can subsequently produce an electrical response to a read sensor, allowing the stored information to be read.

There is an ever increasing demand for magnetic recording media with higher storage capacity, lower noise and lower costs. Efforts, therefore, have been made to reduce the size required to magnetically record bits of information, while maintaining the integrity of the information as size is decreased. The space necessary to record information in magnetic recording media depends upon the size of transitions between oppositely magnetized areas. It is, therefore, desirable to produce magnetic recording media that will support the smallest transition size possible. However, the signal output from the transition must avoid excessive noise to reliably maintain the integrity of the stored information. Media noise is generally characterized as the sharpness of a signal on readback against the sharpness of a signal on writing and is generally expressed in signal-to-media noise ratio (SMNR).

The increasing demands for higher areal recording density impose increasingly greater demands on thin film magnetic recording media in terms of remanent coercivity (Hr), magnetic remanance (Mr), coercivity squareness (S*), SMNR, and narrow track recording performance. It is extremely difficult to produce a magnetic recording medium satisfying such demanding requirements.

The linear recording density can be increased by increasing the Hr of the magnetic recording medium, and can be accomplished by decreasing the medium noise, as by maintaining very fine magnetically non-coupled grains. Medium noise in thin films is a dominant factor restricting increased recording density of high density magnetic hard disk drives, and is attributed primarily to inhomogeneous and large grain size and intergranular exchange coupling. Accordingly, in order to continually increase linear density, medium noise must be minimized by suitable microstructure control.

Longitudinal magnetic recording media containing cobalt (Co) or a Co-based alloy magnetic films with a chromium (Cr) or Cr alloy underlayer deposited on a nonmagnetic substrate have become the industry standard. For thin film longitudinal magnetic recording media, the desired crystallized structure of the Co and Co alloys is hexagonal close packed (HCP) with uniaxial crystalline anisotropy and a magnetization easy direction along the c-axis is in the plane of the film. The better the in-plane c-axis crystallographic texture, the more suitable is the Co alloy thin film for use in longitudinal recording to achieve high remanance. For very small grain sizes coercivity increases with increased grain size. The large grains, however, result in greater noise. Accordingly, there is a need to achieve high coercivities without the increase in noise associated with large grains. In order to achieve low noise magnetic recording media, the Co alloy thin film should have uniform small grains with grain boundaries capable of magnetically isolating neighboring grains. In other words, in order to continually increase recording density, the magnetic grain size and grain size distribution must be decreased. A small magnetic grain size and small grain size distribution will lead to decreased media noise and improved thermal stability. The magnetic grain size is affected by the substrate surface condition, and processing conditions such as substrate temperature, bias voltage, underlayer alloys and magnetic alloys. Microstructural and crystallographic control is typically attempted by manipulating the deposition process, grooving the substrate surface and proper use of an underlayer.

Underlayers can strongly influence the crystallographic orientation, grain size and chemical segregation of the Co alloy grain boundaries. Conventional underlayers include Cr and alloys of Cr with elements such as titanium (Ti), tungsten (W), molybdenum (Mo) and vanadium (V).

It is recognized that magnetic properties, such as Hr. Mr, S* and SMNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particular for growing fine grains of HCP Co alloys deposited thereon.

In copending U.S. patent application Ser. No. 09/382,581, now U.S. Pat. No. 6348276, filed on Aug. 25, 1999 a magnetic recording medium is disclosed comprising a surface-oxidized nickel-aluminum (NiAl) sub-seedlayer, a NiAl seedlayer, a Cr-alloy underlayer, an intermediate CoCrTa alloy, a magnetic layer and a carbon-containing protective overcoat.

In copending U.S. patent application Ser. No. 09/152,326 filed on Sep. 14, 1998, now U.S. Pat. No. 6117570, filed on Sep. 14, 1998 a magnetic recording medium is disclosed comprising a NiAl seedlayer having an oxidized surface, a chromium underlayer on the seedlayer, and a magnetic layer of the underlayer.

Okumura et al. in U.S. Pat. No. 5,480,733 disclose a magnetic recording medium comprising an NiP—X laminated on a nonmetallic substrate with sequentially formed Cr underlayer, magnetic recording layer and protection layer thereon, wherein X is one or more elements belonging to group 4, 5 and 6 of the periodic table. Zhang in U.S. Pat. No. 5,858,566 discloses a magnetic recording medium comprising a NiAl seedlayer, a Cr underlayer and a Co magnetic layer. Ataka et al. in U.S. Pat. No. 5,939,202 disclose a magnetic recording medium comprising a non-magnetic substrate, non-magnetic base layer, magnetic layer and protective layer, wherein the non-magnetic metal base layer contains NiAl to which at least one of tungsten (W), tantalum (Ta), hafnium (Hf), molybdenum (Mo), Cr, zirconium (Zr) and niobium (Nb) is added.

Okumura et al. in U.S. Pat. No. 5,700,593 disclose a magnetic recording medium comprising a substrate and a seedlayer comprising an oxygen-containing non-magnetic amorphous metal or a seedlayer comprising a non-magnetic amorphous metal having an oxygen-containing layer thereon, and an underlying non-magnetic layer laminated on the seedlayer. Doerner et al. in U.S. Pat. No. 5,302,434 disclose a magnetic recording medium comprising an untextured nickel phosphorous coating on a disk substrate which is oxidized to form a nickel oxide film. Suzuki et al. in U.S. Pat. No. 5,587,234 disclose a magnetic recording medium comprising a multi-layer structure containing at least one paramagnetic intermediate region or oxygen-rich region disposed between magnet layers. Chen et al. in U.S. Pat. No. 5,866,227 disclose a magnetic recording medium comprising a glass or glass-ceramic substrate formed by sequentially depositing thereon a partially oxidized nickel phosphorous seedlayer, an underlayer and a magnetic layer. Chen et al. in U.S. Pat. No. 6,010,795 disclose a magnetic recording medium comprising a surface oxidized NiP seedlayer, a Cr-containing subunderlayer, a NiAl or FeAl underlayer, Cr-containing intermediate layer and magnetic layer. Takahashi in U.S. Pat. No. 6,042,939 discloses a magnetic recording medium comprising an oxidized NiP layer.

There exists a continuing need for high areal density longitudinal magnetic recording media exhibiting high Hr and high SMNR, and methodology for manufacturing such magnetic recording media. There also exist a need for magnetic recording media containing a glass or glass-ceramic substrate exhibiting high Hr and high SMNR.

DISCLOSURE OF THE INVENTION

An advantage of the present invention is a magnetic recording medium for high areal recording density exhibiting low noise and high Hr.

Another advantage of the present invention is a method of manufacturing a magnetic recording medium suitable for high areal recording density and exhibiting low noise and high Hr.

Additional advantages and features of the present invention will be set forth in part in the description which follows and in part will become apparent to those having ordinary skill in the art upon examination of the following only to be learned from the practice of the present invention. The advantages of the present invention may be realized and obtained as particularly pointed out in the appended claims.

According to the present invention, the foregoing and other advantages are achieved by a magnetic recording medium comprising a non-magnetic substrate; a seedlayer comprising: oxidized nickel phosphorous (NiP) containing at least one dopant element (X) having an oxidation potential greater than that of NiP; or oxidized nickel aluminum (NiAl) containing at least one dopant element (Y) having an oxidation potential greater than that of NiAl; and a magnetic layer.

Another aspect of the present invention is a method of manufacturing a magnetic recording medium, the method comprising depositing a seedlayer comprising: nickel phosphorous (NiP) containing at least one dopant element (X) having an oxidation potential greater than that of NiP; or nickel aluminum (NiAl) containing at least one dopant element (Y) having an oxidation potential greater than that of NiAl; oxidizing the seedlayer and at least one dopant element (X) or (Y); and depositing a magnetic layer.

Embodiments of the present invention comprise magnetic recording media having oxidized seedlayers wherein the dopant elements (X) and (Y) have an oxidation potential greater than $-0.10$ volts and are present in the seedlayer in a total amount of about 200 ppm to about 5 at. % such that, upon oxidation, the seedlayer comprises about 50 to about 500 ppm of oxygen and the magnetic layer has a grain size less than about 10 nm and a uniform grain size distribution with a standard deviation less than about 2 nm.

Embodiments of the present invention further comprise sputter depositing the seedlayer in an oxygen-containing environment to directly deposit an oxidized seedlayer or depositing a NiP or NiAl layer, ion etching the deposited layer, oxidizing the seedlayer in an atmosphere containing about 5 to about 30 vol. % oxygen and then sequentially depositing a Cr or Cr-alloy underlayer, a Co—Cr intermediate layer, a magnetic layer and a carbon-containing protective overcoat.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature and not as restrictive.

BRIEF DESCRIPTION OF THE DRAWINS

FIG. 1 schematically illustrates a magnetic recording medium in accordance with an embodiment of the present invention.

Figure 2:
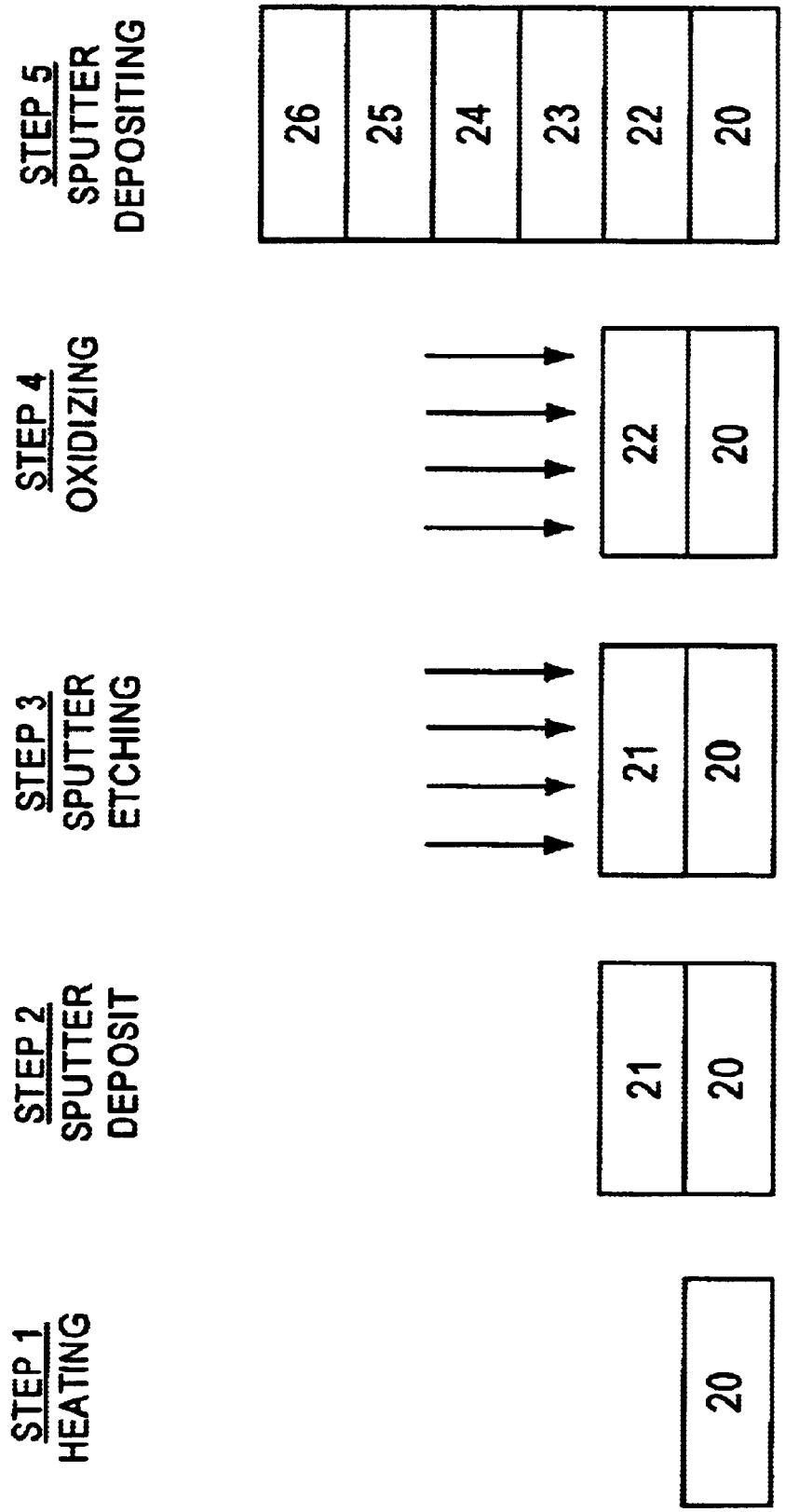

FIG. 2 schematically illustrates a method of manufacturing a magnetic recording medium in accordance with an embodiment of the present invention.

DESCRIPTION OF THE INVENTION

The present invention provides magnetic media suitable for use in high areal recording density longitudinal magnetic recording media exhibiting high Hr and high SMNR. The present invention achieves such technological advantages by strategically reducing the size of the grains and the grain size distribution of the magnetic layer. Advantageously, the reduction in magnetic grain size and reduction in grain size distribution of the magnetic layer in accordance with embodiments of the present invention not only decreases media noise but increases thermal stability thereby enabling a significant increase in recording density of magnetic recording media.

Embodiments of the present invention comprises the use of an oxidized a magnetic layer on the underlayer. seedlayer, such as NiP—X or NiAl—Y, to refine the grain size of a magnetic layer thereby improving SNR and thermal stability. In accordance with embodiments of the present invention, NiP is doped with an element X having a higher oxidation potential than NiP. Examples of such elements (X) are set forth in Table 1 below.

TABLE 1

Oxidation Potentials

| Reaction | Potential[1] (volts) |
|---|---|
| $Al^{+3}$ + 3e to Al | −1.706 |
| $Co^{+2}$ + 2e to Co | −0.28 |
| $Cr^{+2}$ + 2e to Cr | −0.557 |
| $Cr^{+3}$ + 3e to Cr | −0.74 |
| $Fe^{+2}$ + 2e to Fe | −0.409 |
| $Ti^{+2}$ + 2e to Ti | −1.63 |
| $V^{+2}$ + 2e to V | −1.2 |
| $Zn^{+2}$ + 2e to Zn | −0.7628 |
| $Sr^{+2}$ + 2e to Sr | −2.89 |
| $Pb^{+2}$ + 2e to Pb | −0.1263 |
| $Na^{+}$ + e to Na | −2.7109 |
| $Ca^{+2}$ + 2e to Ca | −2.76 |

In accordance with embodiments of the present invention, NiP—X alloys are formed containing about 60 to about 90 at. % Ni, about 10 to about 40 at. % P, doped with a total of about 200 ppm to about 5 at. % of one or more elements X. Typically dopant element X has an oxidation potential greater than about −0.10 volts. Oxidized seedlayers in accordance with embodiments of the present invention typically have a thickness of about 100 Å to about 2,000 Å and contain about 50 to about 500 ppm oxygen.

Embodiments of the present invention further include an oxidized seedlayer of NiAl—Y, wherein Y is an element having a higher oxidation potential than NiAl, typically greater than about −0.10 volts, and can be selected from among those elements set forth in Table II below.

TABLE II

Oxidation Potentials

| Reaction | Potential[1] (volts) |
|---|---|
| $Co^{+2}$ + 2e to Co | −0.28 |
| $Cr^{+2}$ + 2e to Cr | −0.557 |
| $Cr^{+3}$ + 3e to Cr | −0.74 |
| $Fe^{+2}$ + 2e to Fe | −0.409 |
| $Ti^{+2}$ + 2e to Ti | −1.63 |
| $V^{+2}$ + 2e to V | −1.2 |
| $Zn^{+2}$ + 2e to Zn | −0.7628 |
| $Sr^{+2}$ + 2e to Sr | −2.89 |
| $Pb^{+2}$ + 2e to Pb | −0.1263 |
| $Na^{+}$ + e to Na | −2.7109 |
| $Ca^{+2}$ + 2e to Ca | −2.76 |

NiAl—Y alloys in accordance with embodiments of the present invention typically contain about 30 to about 70 at. % nickel, about 30 to about 70 at. % Al, doped with a total of about 220 ppm to about 5 at. % of one or more elements Y. Embodiments of the present invention include oxidized NiAl—Y seedlayers having a thickness of about 100 Å to about 2,000 Å and containing about 50 to about 500 ppm oxygen.

The exact mechanism by which the oxidized seedlayers in accordance with the present invention achieve a refined grain size and reduced grain size distribution of the magnetic layer, thereby improving SNR and thermal stability, is not known with certainty. However, in carrying out the present invention, the dopant elements X and Y are substantially uniformly distributed throughout the NiP and NiAl layers, respectively. It is believed that elements X and Y having a high oxidation potential become highly oxidized and, therefore, serve as uniform nucleation sites for subsequently deposited layers, e.g., underlayer. The subsequently sputter deposited magnetic layer has a resulting small grain size and small grain size distribution which, in turn, reduces media noise which is highly dependant upon the magnetic grain size and grain size distribution. In addition, as a result of the tight grain size distribution, such recording media are thermally stable vis-a-vis conventionally sputter recording medium without the oxidized seedlayers in accordance with embodiments of the present invention. Magnetic recording media in accordance with embodiments of the present invention typically have a magnetic layer with an average grain size less than about 10 nm and a uniform grain size distribution with a standard deviation less than about 2 nm.

Non-magnetic substrates suitable for use in the present invention include any of those typically employed in the manufacture of magnetic recording media including glass, glass-ceramics, ceramics and NiP coated aluminum or aluminum alloys. Embodiments of the present invention comprise sputter depositing an underlayer, such as a Cr or Cr alloy underlay, e.g., chromium-molybdenum (CrMo), on the oxidized seedlayer. The underlayer can be sputter deposited at a thickness of 20 Å to about 1,000 Å, e.g., about 25 Å to about 100 Å.

Embodiments of the present invention also include sputter depositing an intermediate CoCr layer, such as CoCr, CoCrTa or CoCrPt, on the underlayer, for enhanced coercivity. The intermediate CoCr alloy layer can comprise about 10 to about 40 at. % Cr, up to about 6 at. % Ta or up to about 6 at. % Pt, the balance Co. The magnetic layer deposited in accordance with the present invention can comprise any of various Co alloys, such as Co—Cr alloys, e.g., cobalt-chromium-platinum, cobalt-chromium-tantalum, cobalt-chromium-platinum-tantalum, cobalt-chromium-platinum-tantalum-niobium alloys.

A magnetic recording medium in accordance with an embodiment of the present invention is schematically illustrated in FIG. 1 and comprises substrate 10, e.g., a glass or glass-ceramic substrate, an oxidized NiP—X or NiAl—Y seedlayer 11, a Cr alloy underlayer 12, e.g., CrMo, on oxidized seedlayer 11, an optional intermediate CoCr alloy layer 13 on underlayer 13, a Co-alloy magnetic layer 14 on optional intermediate CoCr alloy layer 13, and a protective overcoat 15, e.g., a carbon-containing protective overcoat. A conventional lubricant topcoat (not shown) is typically provided on protective overcoat 16. It should be understood that the layers 11–15 are sequentially deposited on both sides of substrate 10.

Embodiments of the present invention include sputter depositing NiP—X or NiAl—Y on a glass or glass ceramic substrate in an oxidizing atmosphere to deposit an oxidized seedlayer. Other embodiments of the present invention comprise sputter depositing a layer of NiP—X or NiAl—Y and oxidizing the sputter deposited NiP—X or NiAl—Y seedlayer at a suitable temperature, e.g., about 20° C. to about 300° C., in an oxidizing atmosphere. Suitable oxidizing atmospheres can contain about 1to about 100 vol. % of oxygen ($O_2$), the remainder an inert gas, such as argon (Ar), such as an atmosphere containing Ar and about 5 to about 30 vol. % $O_2$. Embodiments of the present invention also include reverse sputter etching the deposited NiP—X or NiAl—Y layer to remove impurities prior to oxidation.

Advantageously, magnetic recording medium in accordance with the present invention can be manufactured on either an in-line pass-by or a single disk sputter machine modified for use in accordance with the present invention. A method in accordance with an embodiment of the present invention is schematically illustrated in FIG. 2 and comprises heating substrate 20 to a suitable preparatory temperature, e.g., about 20° C. to about 300° C, prior to sputter depositing a NiP—X or NiAl—Y layer 21 in step 2. The upper surface of layer 21 is then subjected to reverse sputtering to etch away surface contamination. Oxidation is then conducted in step 4 to form oxidized seedlayer 22. Subsequently, as shown in step 5, underlayer 23, intermediate CoCr layer 24, magnetic layer 25 and carbon-containing protective overcoat 26 are sequentially sputter deposited.

The present invention advantageously provides high areal recording density longitudinal magnetic recording media having a magnetic layer with reduced grain size and reduced grain size distribution and, hence, reduced medium noise, high thermal stability and high coercivity. The present invention is applicable to the production of various types of magnetic recording media, and is not limited to any particular substrate material, underlayer, magnetic-layer, protective overcoat or lubricant topcoat.

Only certain embodiments of the present invention and but a few examples of its versatility are shown and described in the present disclosure. It is to be understood that the present invention is capable of use in various other combinations and in environments, and is capable of changes and modifications within the scope of the inventive concept as expressed herein.

What is claimed is:

1. A magnetic recording medium comprising:
    a non-magnetic substrate;
    a seedlayer comprising oxidized nickel phosphorous (NiP) containing at least one dopant element (X) having an oxidation potential greater than that of NiP.

2. The magnetic medium according to claim 1, wherein the seedlayer comprises a total of about 200 ppm to about 5 at. % dopant element (X).

3. The magnetic recording medium according to claim 2, wherein: dopant element (X) is selected form the group consisting of aluminum, cobalt, chromium, iron, titanium, vanadium, zinc, strontium, lead, sodium and calcium.

4. The magnetic recording medium according to claim 3, wherein the seedlayer comprises about 50 to about 500 ppm oxygen. at. % phosphorous.

5. The magnetic recording medium according to claim 1, wherein the seedlayer comprises about 60 to about 90 at. % nickel and about 10 to about 40 at. % phosphorous.

6. The magnetic recording medium according to claim 3, wherein the seedlayer comprises oxidized NiP containing at least one oxidized dopant element (X) uniformly distributed therein.

7. The magnetic recording medium according to claim 2, further comprising:
    a chromium or chromium alloy underlayer on the seedlayer;
    a cobalt-chromium intermediate layer on the underlayer;
    the magnetic layer on the intermediate layer; and
    a carbon-containing protective overcoat on the magnetic layer.

8. A method of manufacturing a magnetic recording medium, the method comprising:
    depositing a seedlayer comprising:
        nickel phosphorous (NiP) containing at least one dopant element (X) having an oxidation potential greater than that of NiP; or
        nickel aluminum (NiAl) containing at least one dopant element (Y) having an oxidation potential greater than that of NiAl selected from the group consisting of cobalt, iron, titaniun, vanadium, zinc, strontium, lead, and calcium, the dopant element (Y) being uniformly distributed throughout the NiAl;
    oxidizing the seedlayer and at least one dopant element (X) or (Y); and
    depositing a magnetic layer.

9. The method according to claim 8, wherein each of dopant elements (X) and (Y) has an oxidation potential greater than −0.10 volts.

10. The method according to claim 8, comprising ion etching the deposited seedlayer prior to oxidizing the seedlayer.

11. The method according to claim 8, comprising oxidizing the seedlayer in an atmosphere containing argon and about 5 to about 30 vol. % oxygen, wherein the oxidized seedlayer comprises about 50 to about 500 ppm oxygen.

12. The method according to claim 11, wherein:
    dopant element (X) is selected from the group consisting of aluminum, cobalt, chromium, iron, titanium, vanadium, zinc, strontium, lead, sodium and calcium.

13. The method according to claim 11, comprising depositing a NiAl seedlayer containing 30 to 70 at. % Ni and abou 30 to about 70 at. % Al, and having dopant element (X) distributed therein.

14. The method according to claim 11, comprising depositing a NiP seedlayer containing about 60 to about 90 at. % Ni and 10 to about 40 at. % P, and having dopant element (Y) distributed therein.

15. The method according to claim 11, further comprising:
    depositing a chromium or chromium alloy underlayer on the oxidized seedlayer;
    depositing a cobalt-chromium intermediate layer on the underlayer;
    depositing the magnetic layer on the intermediate layer; and
    depositing a carbon-containing protective overcoat on the magnetic layer.

16. The magnetic recording medium according to claim 1, wherein dopant element (X) is selected from the group consisting of aluminum, cobalt, chromium, iron, titanium, vanadium, zinc, strontium, lead, sodium and calcium.

17. The magnetic recording medium according to claim 1, wherein the dopant element (X) has an oxidation potential greater than −0.1 volts.

18. The magnetic recording medium according to claim 1, wherein the seedlayer comprises about 50 to about 500 ppm oxygen.

19. A magnetic recording medium comprising:
    a non-magnetic substrate;
    a seedlayer comprising;
        oxidized nickel phosphorous (NiP) containing at least one dopant element (X) having an oxidation potential greater than that of NiP; or
        oxidized nickel aluminum (NiAl) containing at least one dopant element (Y) having an oxidation potential greater than that of NiAl selected from the group consisting of cobalt, iron, titanium, vanadium, zinc, strontium, lead, sodium and calcium; and
    a magnetic layer.

* * * * *